United States Patent
Naruse et al.

(10) Patent No.: US 9,759,269 B2
(45) Date of Patent: Sep. 12, 2017

(54) POWER TRANSMISSION UNIT, IMAGE FORMING APPARATUS, CONTROL METHOD FOR POWER TRANSMISSION UNIT AND COMPUTER-READABLE MEDIUM CARRYING CONTROL PROGRAM FOR POWER TRANSMISSION UNIT

(71) Applicant: KONICA MINOLTA, INC., Chiyoda-ku (JP)

(72) Inventors: Kunihiko Naruse, Toyokawa (JP); Yoshiyuki Suwa, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 587 days.

(21) Appl. No.: 14/480,668

(22) Filed: Sep. 9, 2014

(65) Prior Publication Data

US 2015/0073600 A1    Mar. 12, 2015

(30) Foreign Application Priority Data

Sep. 12, 2013   (JP) .................................. 2013-189226

(51) Int. Cl.
*F16D 21/00*    (2006.01)
*F16D 11/14*    (2006.01)
(Continued)

(52) U.S. Cl.
CPC .................................... *F16D 11/14* (2013.01)

(58) Field of Classification Search
None
See application file for complete search history.

(56) References Cited

U.S. PATENT DOCUMENTS 6,164,206 A * 12/2000 Yoshida ................. B41J 13/106
    101/484
6,334,725 B1 * 1/2002 Miyauchi ............... B41J 23/025
    271/10.13

(Continued)

FOREIGN PATENT DOCUMENTS

| JP | 33-009805 B | 11/1958 |
| JP | 07-269603 A | 10/1995 |
| JP | 2010-169875 A | 8/2010 |

OTHER PUBLICATIONS

Office Action (Notification of Reasons for Refusal) dated Aug. 18, 2015, issued by the Japanese Patent Office in corresponding Japanese Patent Application No. 2013-189226, and an English translation of the Office Action. (5 pages).

*Primary Examiner* — Ronald Hartman, Jr.
(74) *Attorney, Agent, or Firm* — Buchanan Ingersoll & Rooney PC

(57) ABSTRACT

A plurality of engaging claws formed at a connecting member mounted to a rotary member of a driving unit via a one-way clutch are brought into engagement with a plurality of engageable grooves formed at a connecting member mounted to a rotated member of a driven unit so as to transmit the forward rotation of the rotary member to the rotated member. When the driven unit is mounted to the driving unit, the rotary member is forwardly rotated to bring at least one of the engaging claws into engagement with the engageable groove. Subsequently, the rotary member is reversely rotated to bring the respective engaging claws into engagement with the respective engageable grooves.

8 Claims, 16 Drawing Sheets

(51) Int. Cl.
*F16D 41/00* (2006.01)
*F16H 3/44* (2006.01)

(56) References Cited

U.S. PATENT DOCUMENTS

| | | | | |
|---|---|---|---|---|
| 6,523,929 | B2* | 2/2003 | Kan | B41J 23/025 347/22 |
| 6,536,864 | B2* | 3/2003 | Kan | B41J 23/025 347/22 |
| 6,539,189 | B2* | 3/2003 | Yanagida | G03G 21/0005 399/167 |
| 7,020,405 | B2* | 3/2006 | Ishikawa | G03G 15/0266 399/43 |
| 7,912,417 | B2* | 3/2011 | Yoshida | G03G 15/6567 271/242 |
| 7,995,938 | B2* | 8/2011 | Ryu | H02P 8/10 318/685 |
| 8,016,283 | B2* | 9/2011 | Ueda | B65H 3/0607 271/117 |
| 8,276,474 | B2* | 10/2012 | Kim | G03G 15/757 74/10.39 |
| 8,315,542 | B2* | 11/2012 | Kim | G03G 15/234 399/167 |
| 8,509,632 | B2* | 8/2013 | Tajima | G03G 15/0896 399/30 |
| 8,613,445 | B2* | 12/2013 | Nishii | B65H 85/00 271/186 |
| 8,855,533 | B2* | 10/2014 | Kim | G03G 15/234 399/167 |
| 8,900,088 | B2* | 12/2014 | Yasuda | G03G 15/757 475/311 |
| 8,919,920 | B2* | 12/2014 | Suzuki | B41J 23/12 347/104 |
| 9,127,754 | B2* | 9/2015 | Yasuda | G03G 15/0189 |
| 2001/0017635 | A1* | 8/2001 | Kan | B41J 2/1652 347/22 |
| 2002/0034401 | A1* | 3/2002 | Yanagida | G03G 15/5008 399/167 |
| 2004/0256787 | A1* | 12/2004 | Wada | B65H 3/0669 271/109 |
| 2008/0190242 | A1* | 8/2008 | Kim | G03G 15/757 74/84 R |
| 2009/0180808 | A1* | 7/2009 | Hyun-ho | G03G 15/234 399/222 |
| 2010/0239290 | A1* | 9/2010 | Ryu | H02P 8/10 399/53 |
| 2013/0051885 | A1* | 2/2013 | Kim | G03G 15/234 399/401 |
| 2013/0101314 | A1* | 4/2013 | Yasuda | G03G 15/757 399/167 |
| 2013/0106050 | A1* | 5/2013 | Nishii | B65H 85/00 271/225 |
| 2013/0237366 | A1* | 9/2013 | Yasuda | G03G 15/0189 475/280 |

* cited by examiner

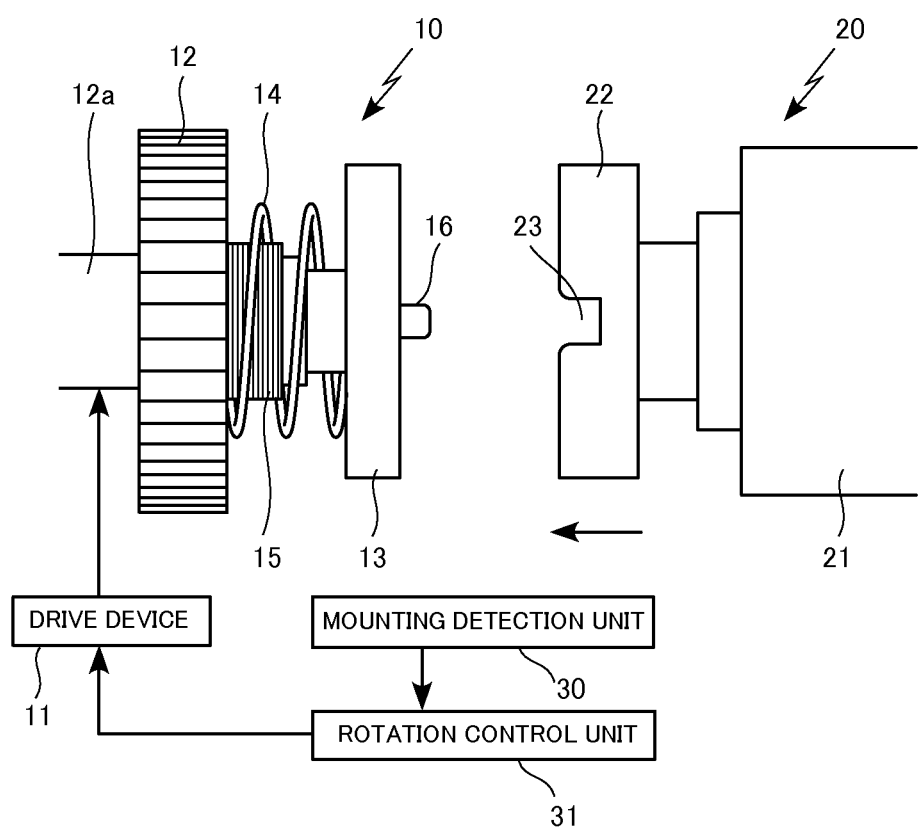
[Fig. 1]

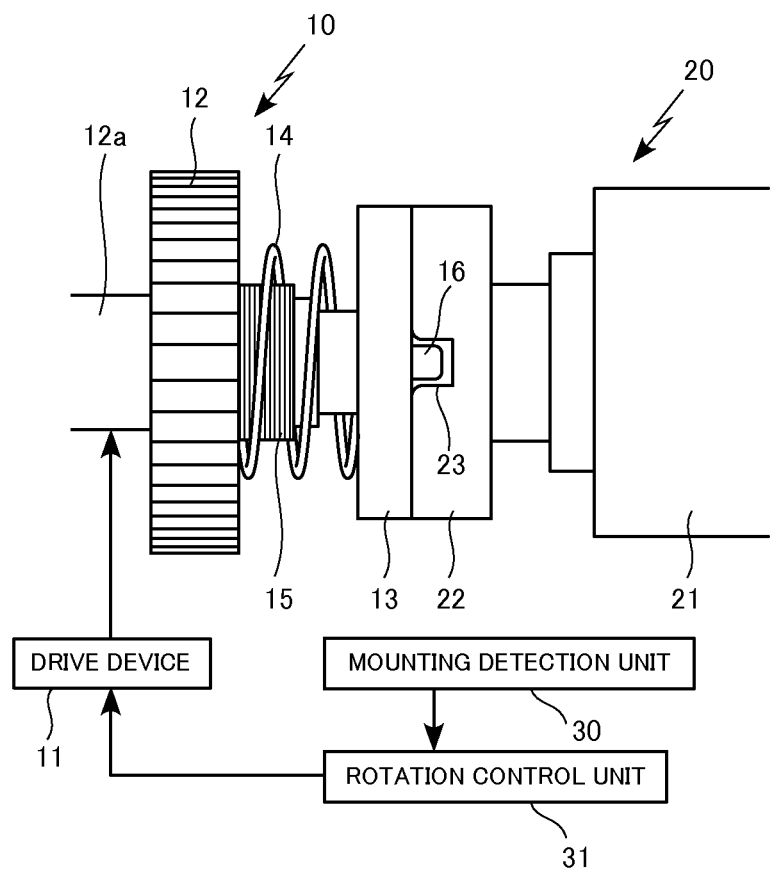
[Fig. 2]

【Fig. 3】
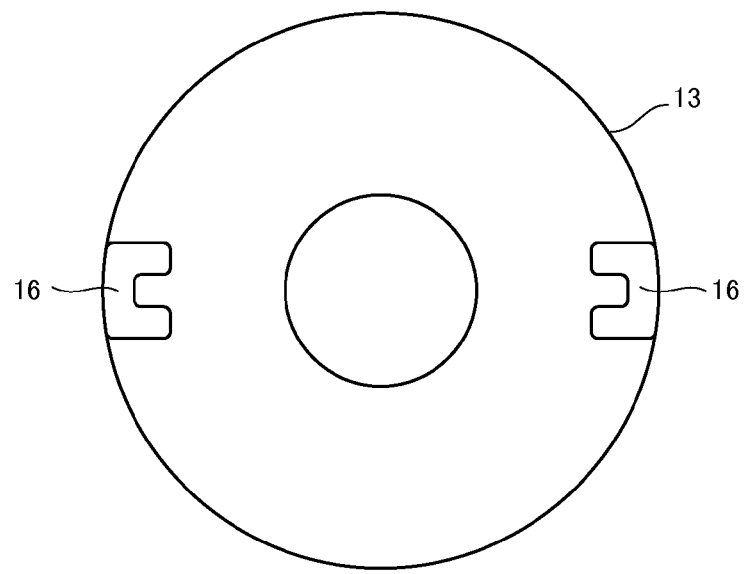
【Fig. 4】
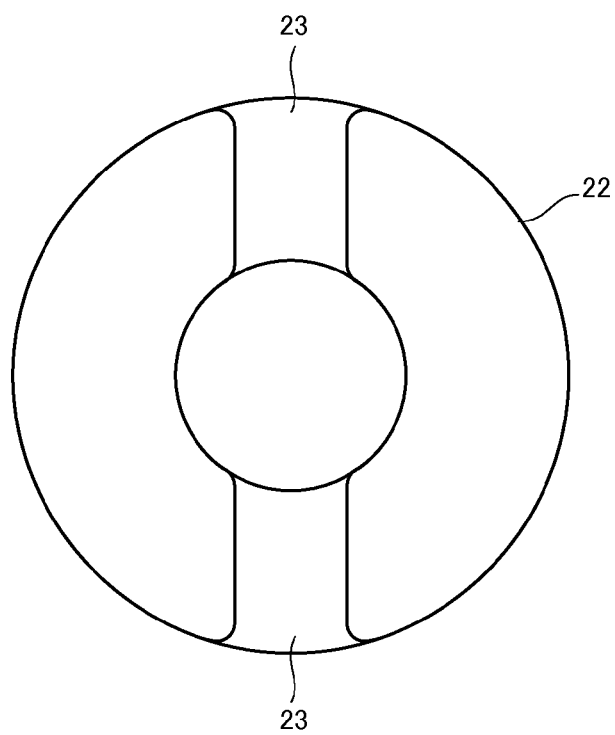

[Fig. 5]
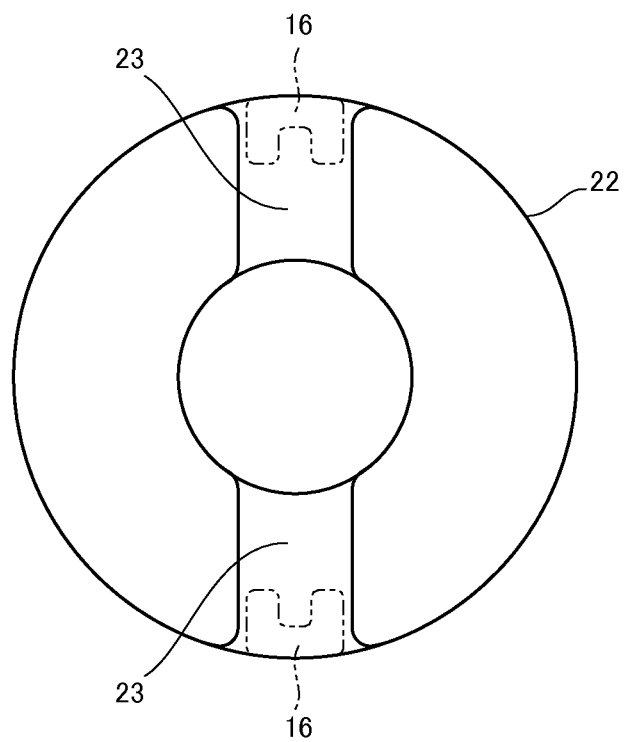

[Fig. 6]
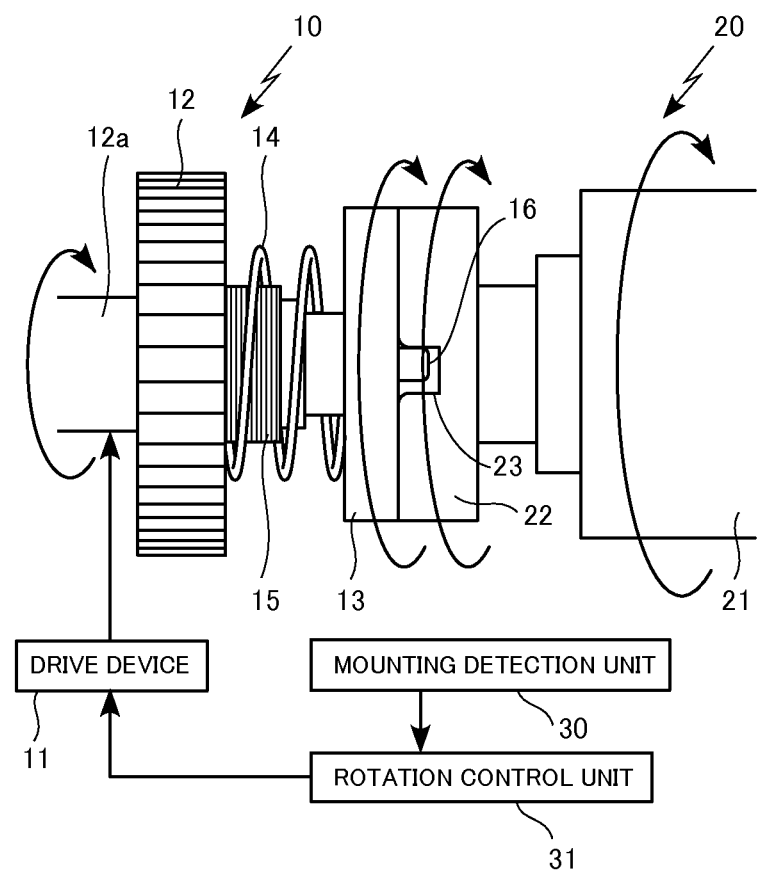

[Fig. 7]
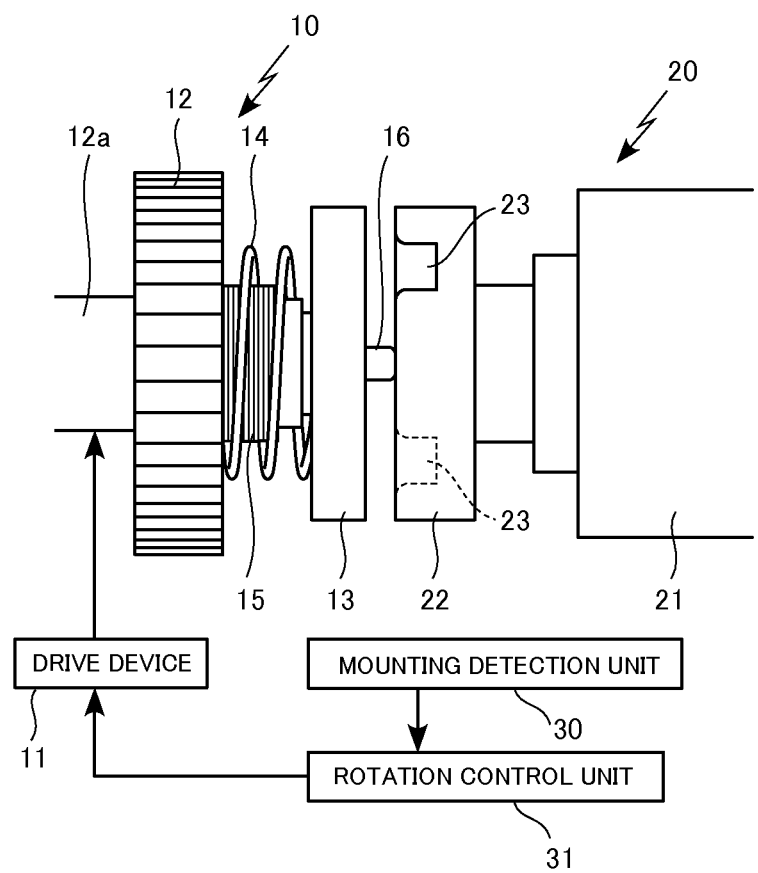

[Fig. 8]
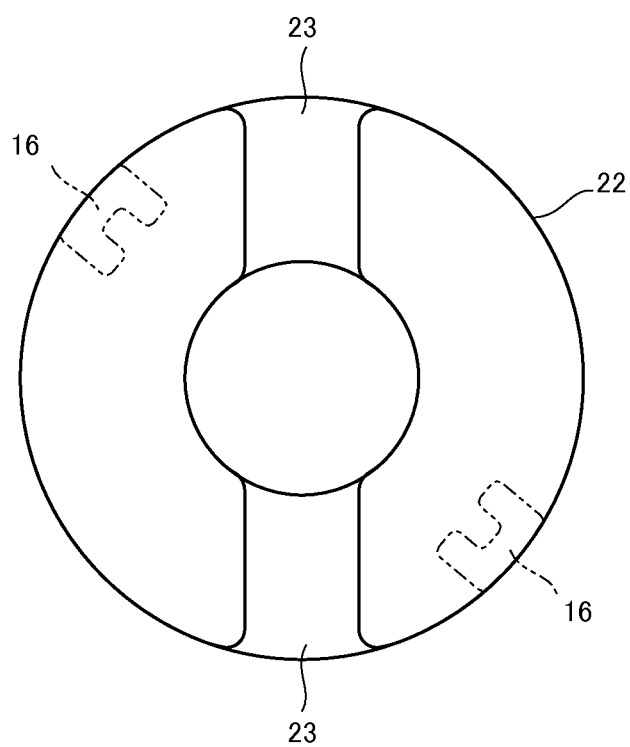

[Fig. 9]
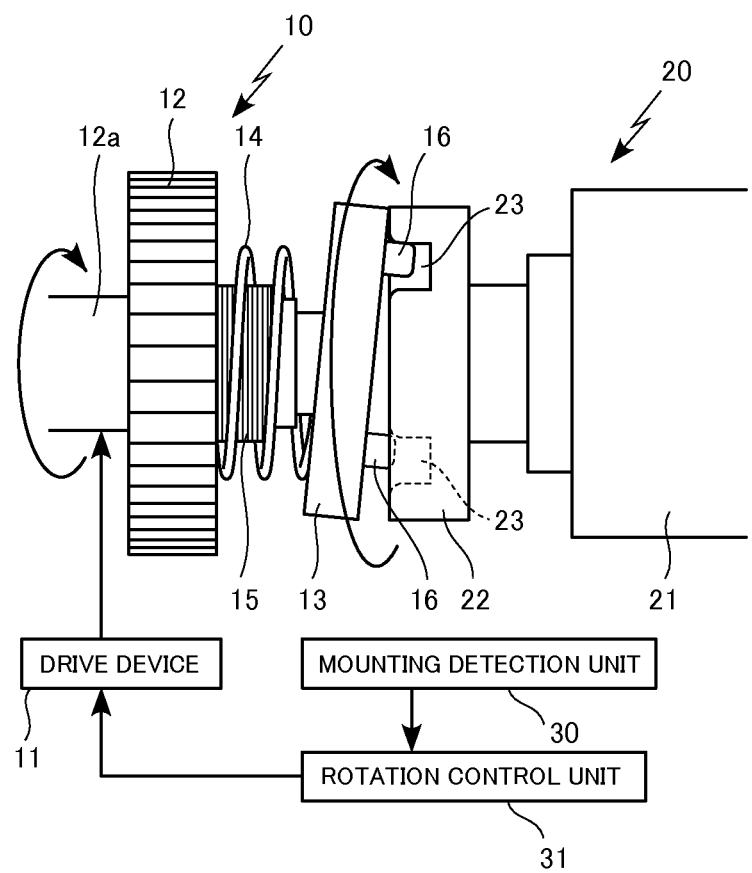

[Fig. 10]
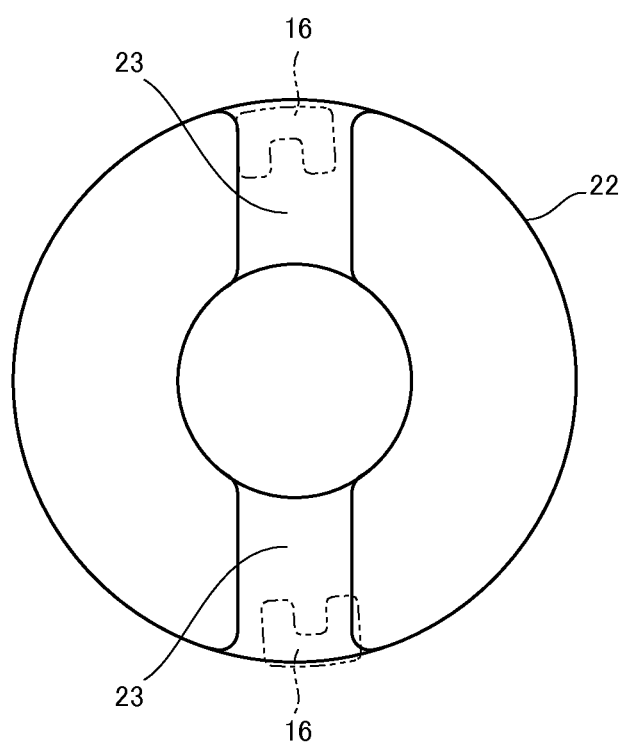

[Fig. 11A]
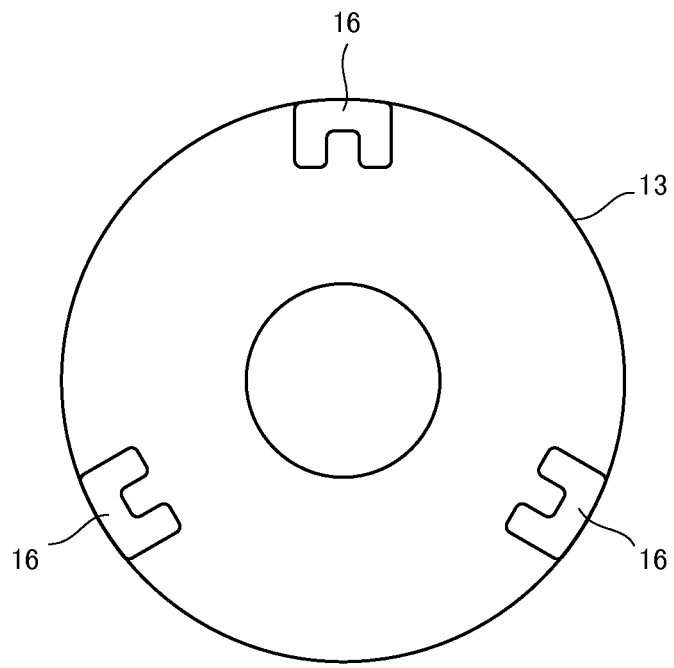
[Fig. 11B]
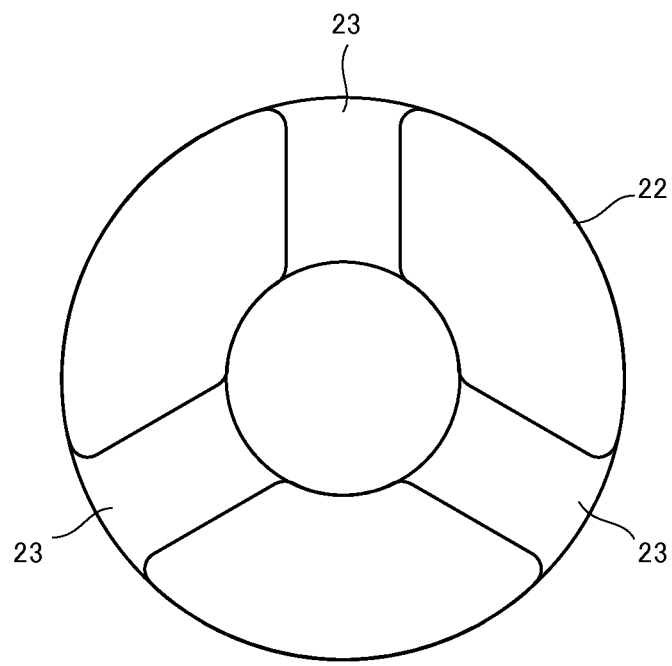

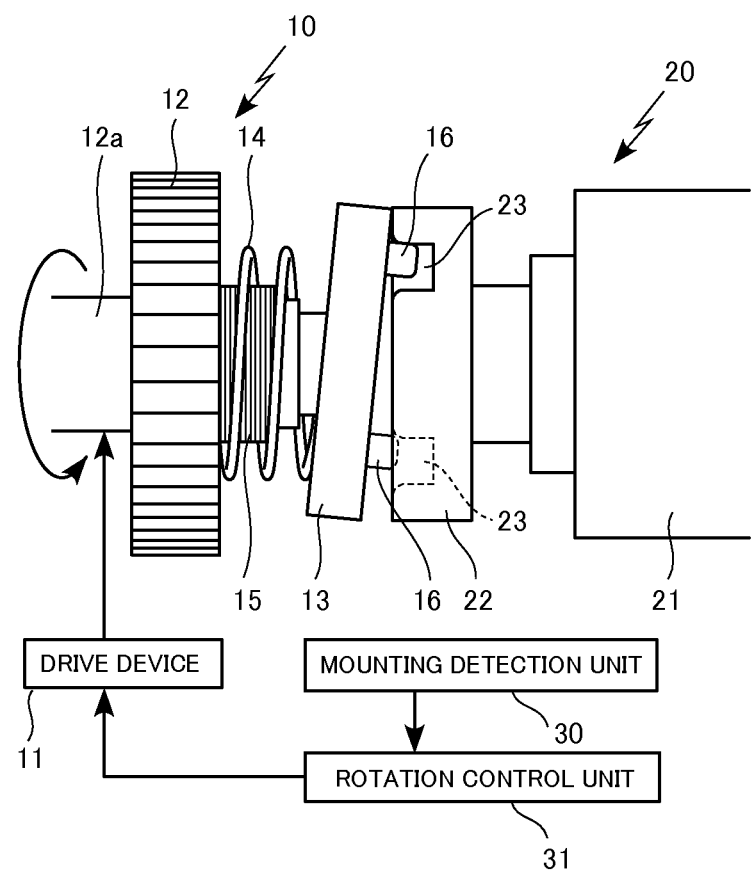
[Fig. 12]

[Fig. 13]
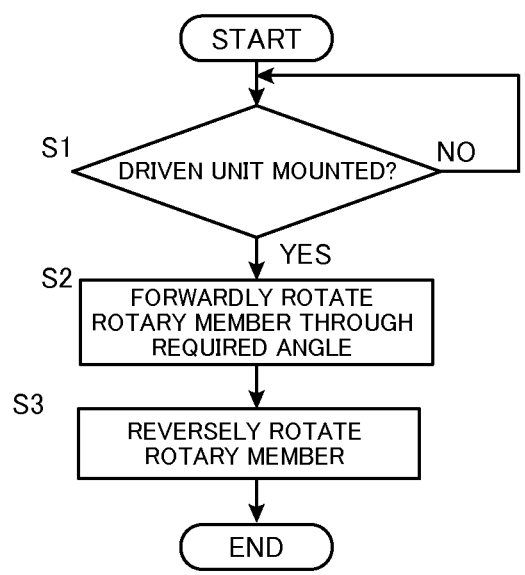

[Fig. 14]
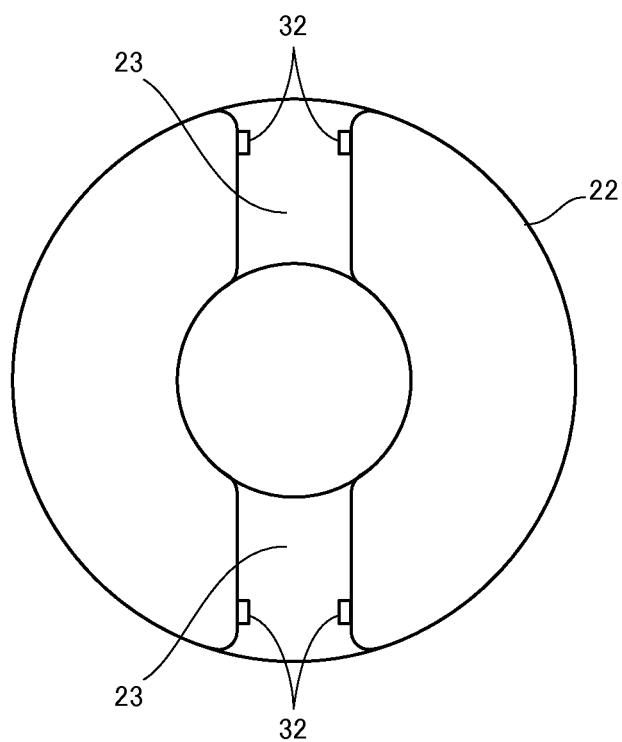

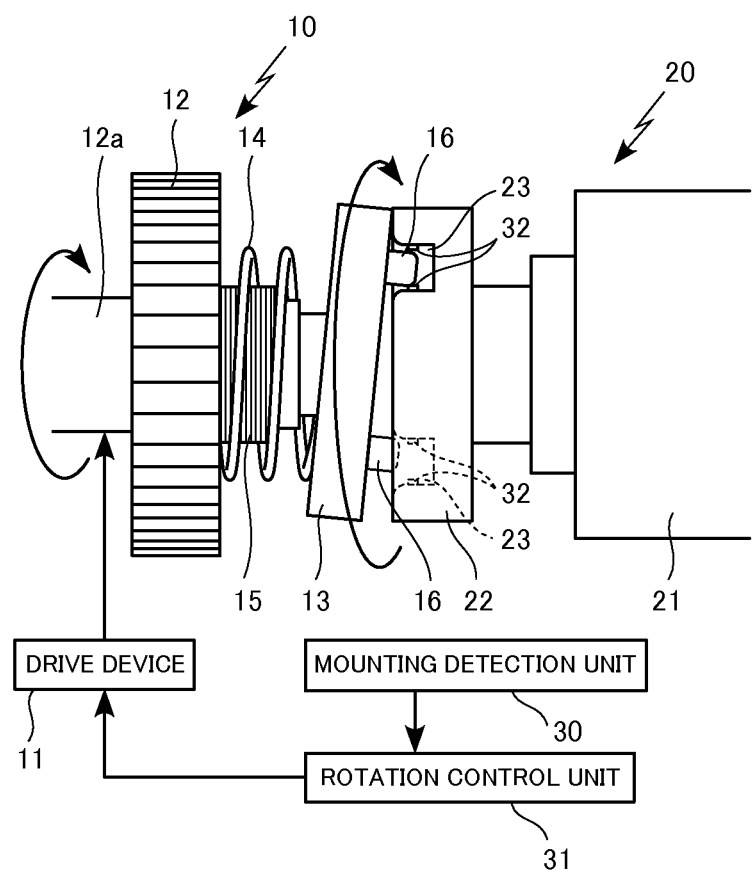
[Fig. 15]

[Fig. 16]
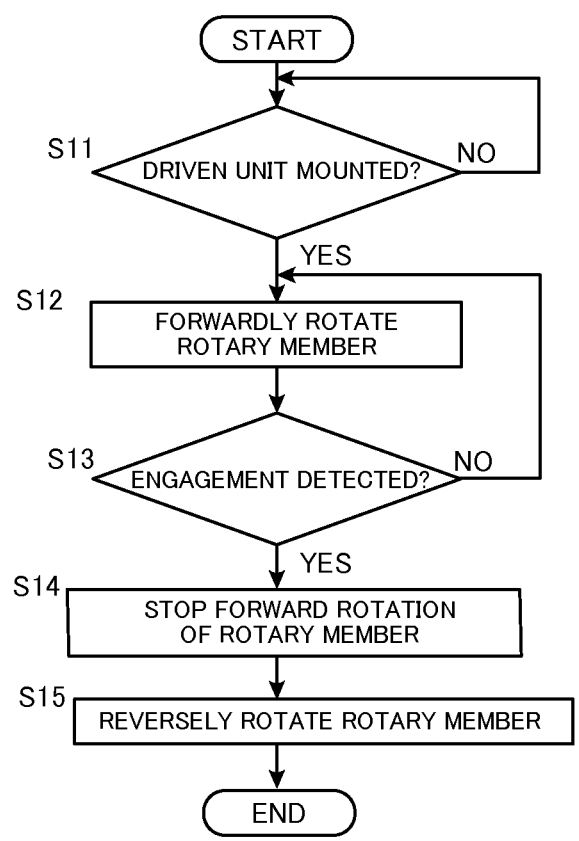

[Fig. 17]
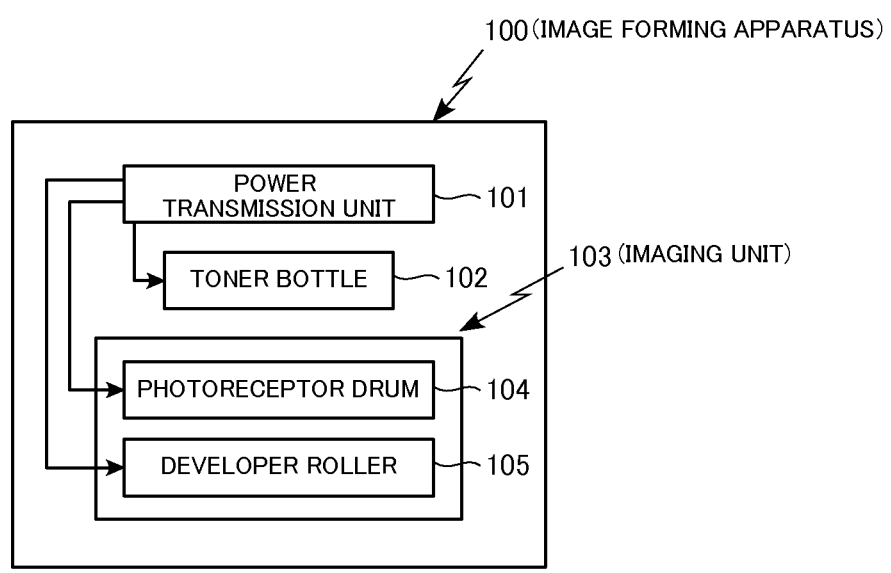

POWER TRANSMISSION UNIT, IMAGE FORMING APPARATUS, CONTROL METHOD FOR POWER TRANSMISSION UNIT AND COMPUTER-READABLE MEDIUM CARRYING CONTROL PROGRAM FOR POWER TRANSMISSION UNIT

RELATED APPLICATION

The priority application Number Japanese Patent Application 2013-189226 upon which this application is based is hereby incorporated by reference.

BACKGROUND OF THE INVENTION

Field of the Invention

The present invention relates to: a power transmission unit in which a driving unit including a rotary member forwardly or reversely rotated by a drive device is removably mounted with a driven unit including a rotated member to be connected to the rotary member and which is adapted to enable a one-way clutch to transmit the forward rotation of the rotary member to the rotated member or to disable the one-way clutch to transmit the reverse rotation of the rotary member to the rotated member; an image forming apparatus employing such a power transmission unit; a control method for such a power transmission unit; and a computer-readable medium carrying a control program for such a power transmission unit.

Description of the Related Art

The image forming apparatuses such as copiers, printers, facsimiles and multi-functional peripherals thereof have conventionally employed a power transmission unit in which the rotary member rotatably driven by the drive device disposed at the driving unit of a main body of the apparatus is connected with the rotated member such as a toner bottle or photoreceptor drum disposed in the driven unit such as a toner cartridge or process cartridge so as to transmit the rotation of the rotary member to the rotated member.

Such a power transmission unit where the rotary member is connected with the rotated member so as to transmit the rotation of the rotary member to the rotated member is disclosed in Patent Document 1 (Japanese Unexamined Patent Publication No. 2010-169875) and the like. The power transmission unit is constructed as follows. One of the connecting members interconnecting the rotary member and the rotated member is circumferentially formed with a plurality of engaging claws projected toward the other connecting member while the other connecting member is circumferentially formed with a plurality of engageable grooves to be engaged with the engaging claws. The driven unit is mounted to the driving unit. The one connecting member connecting the rotary member to the rotated member is biased to the other connecting member by a biasing member such as a spring so as to bring the engaging claws formed at the one connecting member into engagement with the engageable grooves formed at the other connecting member.

According to such a power transmission unit, with the engaging claws of the connecting member engaged with the engageable grooves of the other connecting member, the rotary member is rotated by the drive device while the one-way clutch is enabled to transmit the forward rotation of the rotary member to the rotated member but is disabled to transmit the reverse rotation of the rotary member to the rotated member.

In the above-described power transmission unit, however, all the engaging claws of the one connecting member are not always brought into proper engagement with all the engageable grooves of the other connecting member when the driven unit is mounted to the driving unit.

In a state where all the engaging claws are not properly engaged with all the engageable grooves, for example, the forward rotation of the rotary member, which is forwardly rotated by the drive device, cannot be adequately transmitted to the rotated member via the connecting members so that the rotated member cannot be rotated properly. There is another problem that even though only some of the engaging claws engage with the engageable grooves, load is applied between the some engaging claws and engageable grooves in engagement, causing damage on these engaged parts.

Therefore, Patent Document 1 proposes the following procedure. After the driven unit is mounted to the driving unit, the drive device reversely rotates the rotary member before forwardly rotating the rotary member. Thus, frictional force between the engaging claws and the engageable grooves is reduced in case that the engaging claws are shallow-engaged with the engageable grooves. This allows the engaging claws to be properly engaged with the engageable grooves.

In the above-described power transmission unit, however, the one-way clutch merely transmits the forward rotation of the rotary member to the rotated member via the connecting members. When the rotary member is reversely rotated, therefore, the connecting member disposed at the rotary member is not rotated but the rotary member idles alone.

If the rotary member is reversely rotated with the above-described engaging claws and engageable grooves totally out of engagement, the rotary member idles alone while the connecting member disposed at the rotary member is not rotated. Hence, the engaging claws formed at the connecting member of the rotary member do not come into engagement with the engageable grooves formed at the connecting member of the rotated member.

In a case where the rotary member is forwardly rotated with the engaging claws and the engageable grooves totally out of engagement as just described, all the engaging claws are not always engaged with all the engageable grooves, as described above. Only some of the engaging claws engage with the engageable grooves while the other engaging claws run on the other connecting member, failing to engage with the corresponding engageable grooves. When the rotary member is forwardly rotated in this state, the forward rotation of the rotary member is not adequately transmitted to the rotated member. There still exists the problem that the rotated member is not rotated properly or that the load is applied between the some engaging claws and engageable grooves, causing damage on these components.

SUMMARY OF THE INVENTION

A power transmission unit according to the invention includes:
 a drive device;
 a driving unit including a rotary member forwardly or reversely rotated by the drive device;
 a driven unit removably mounted to the driving unit and including a rotated member to which the rotation of the rotary member is transmitted;
 the rotary member and the rotated member each provided with a connecting member, one of the connecting members circumferentially formed with a plurality of engaging claws projected toward the other connecting member, the other connecting member circumferentially formed with a plurality of engageable grooves to be engaged with the engaging claws, a one-way clutch which transmits the forward rotation of the rotary member to the connecting member disposed at the rotary member but is disabled for transmission of the reverse rotation of the rotary member to the connecting member;

a mounting detection unit for detecting the mounting of the driven unit to the driving unit; and a rotation control unit for controlling the rotation of the rotary member driven by the drive device, wherein in a case where the mounting of the driven unit to the driving unit is detected by the mounting detection unit, the rotation control unit forwardly rotates the rotary member to bring at least one of the engaging claws formed at one of the connecting members of the rotary member and the rotated member into engagement with the engageable groove formed at the other connecting member and thereafter, reversely rotates the rotary member to bring the respective engaging claws formed at the one connecting member into engagement with the respective engageable grooves formed at the other connecting member.

When the mounting of the driven unit to the driving unit is detected by the mounting detection unit and the rotation control unit forwardly rotates the rotary member as taught by the power transmission unit according to the invention, the connecting member at the rotary member is forwardly rotated by means of the one-way clutch. Thus, at least one of the engaging claws is brought into engagement with the engageable groove even when the engaging claws and the engageable grooves are totally out of engagement. When at least one of the engaging claws is engaged with the engageable groove in this manner, the connecting member at the rotary member and the connecting member at the rotated member are thereby positioned to some degree. Accordingly, the other engaging claws and engageable grooves come into a degree of engagement, if not properly engaged together. Subsequently when the rotary member is reversely rotated in this state, the one-way clutch is disabled for transmission of the rotation of the rotary member to the connecting member. The connecting member of the rotary member is released from the forward biasing force so that the other engaging claws and engageable grooves in a degree of engagement are allowed to come into engagement, as in a conventional case. Thus, the respective engaging claws are properly engaged with the respective engageable grooves.

According to the power transmission unit of the invention, the above-described one-way clutch may be a spring-type one-way clutch which has a spring fastened by the forward rotation of the rotary member so as to be enabled for transmission of the forward rotation of the rotary member to the connecting member, and which has the spring loosened by the reverse rotation of the rotary member so as to be disabled for transmission of the reverse rotation of the rotary member to the connecting member. The use of such a spring-type one-way clutch provides the following operation. If the rotary member is forwardly rotated to bring at least one of the engaging claws into engagement with the engageable groove and then is reversely rotated, as described above, the spring of this one-way clutch is loosened so that the connecting member of the rotary member is released from the biasing force applied thereto by the forward rotation of the rotary member. Hence, the other engaging claws and engageable grooves in a degree of engagement are allowed to come into more positive engagement. Thus, the respective engaging claws are properly engaged with the respective engageable grooves.

In order for the rotation control unit to forwardly rotate the rotary member to a position where at least one of the engaging claws is engaged with the engageable groove as described above, the plurality of engaging claws and the plurality of engageable grooves may be circumferentially arranged with equal spacing and the rotation control unit may forwardly rotate the rotary member through at least an angle corresponding to the equal spacing in the circumferential direction.

There may also be provided an engagement detection unit for detecting the above-described engagement of at least one of the engaging claws with the engageable groove. The rotary member is forwardly rotated by the rotation control unit while the engagement of at least one of the engaging claws with the engageable groove can be detected by the engagement detection unit.

An image forming apparatus according to the invention employs the above-described power transmission unit.

A control method for power transmission unit according to the invention is applied to the above-described power transmission unit and includes the steps:

where the mounting detection unit determines whether the driven unit is mounted to the driving unit or not;

where when the mounting of the driven unit to the driving unit is detected, the rotation control unit forwardly rotates the rotary member to bring at least one of the engaging claws into engagement with the engageable groove; and where when at least one of the engaging claws is engaged with the engageable groove, the rotary member is reversely rotated to bring the respective engaging claws into engagement with the respective engageable grooves.

A computer-readable medium carrying control program for power transmission unit according to the invention is applied to the above-described power transmission unit and carries the steps of:

where the mounting detection unit determines whether the driven unit is mounted to the driving unit or not;

where when the mounting of the driven unit to the driving unit is detected, the rotation control unit forwardly rotates the rotary member to bring at least one of the engaging claws into engagement with the engageable groove; and where when at least one of the engaging claws is engaged with the engageable groove, the rotary member is reversely rotated to bring the respective engaging claws into engagement with the respective engageable grooves.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 1 is a schematic illustration of a power transmission unit according to one embodiment of the invention, showing a state before mounting a driven unit to a driving unit;

FIG. 2 is a schematic illustration of the power transmission unit according to the above embodiment, showing a state where the driven unit is properly mounted to the driving unit and engaging claws formed at a connecting member of a rotary member are properly engaged with engageable grooves formed at a connecting member of a rotated member;

FIG. 3 is a schematic front view of the power transmission unit according to the above embodiment, showing the connecting member of the rotary member which is formed with two engaging claws circumferentially spaced 180° apart from each other;

FIG. 4 is a schematic front view of the power transmission unit according to the above embodiment, showing the connecting member of the rotated member which is formed with two engageable grooves diametrically extended;

FIG. 5 is a schematic illustration of the power transmission unit according to the above embodiment, showing a state where the two engaging claws formed at the connecting member of the rotary member are properly engaged with the two engageable grooves formed at the connecting member of the rotated member;

FIG. 6 is a schematic illustration of the power transmission unit according to the above embodiment, showing a state where when the above rotary member is forwardly rotated with the driven unit properly mounted to the driving unit, the rotated member is properly rotated in the forward direction by means of the connecting members of the rotary member and the rotated member;

FIG. 7 is a schematic illustration of the power transmission unit according to the above embodiment, showing a state where the driven unit is mounted to the driving unit with the respective engaging claws formed at the connecting member of the rotary member out of engagement with the respective engage able grooves formed at the connecting member of the rotated member;

FIG. 8 is a schematic illustration of the power transmission unit according to the above embodiment, showing a state where the respective engaging claws formed at the connecting member of the rotary member are out of engagement with the respective engageable grooves formed at the connecting member of the rotated member;

FIG. 9 is a schematic illustration of the power transmission unit according to the above embodiment, showing a state where the rotary member is forwardly rotated with the respective engaging claws formed at the connecting member thereof out of engagement with the respective engageable grooves formed at the connecting member of the rotated member, so that only one of the engaging claws is engaged with the engageable groove, resulting in the inclination of the connecting member of the rotary member;

FIG. 10 is a schematic illustration of the power transmission unit according to the above embodiment, showing a state where one of the engaging claws formed at the connecting member of the rotary member is engaged with one of the engageable grooves formed at the connecting member of the rotated member while the other engaging claw is misaligned from the other engageable groove;

FIG. 11A is a schematic front view of the rotary member used in the power transmission unit according to the above embodiment, showing a variant example where the connecting member of the rotary member is formed with three engaging claws circumferentially spaced 120° apart from one another;

FIG. 11B a schematic front view of the rotated member used in the power transmission unit according to the above embodiment, showing a variant example where the connecting member of the rotated member is circumferentially formed with three radial engageable grooves at an angular interval of 120°;

FIG. 12 is a schematic illustration of the power transmission unit according to the above embodiment, showing a state where the rotary member is reversely rotated with only one of the engaging claws engaged with the engageable groove;

FIG. 13 is a flow chart of the power transmission unit according to the above embodiment, showing the steps of an operation of mounting the driven unit to the driving unit and properly connecting the connecting member of the rotary member with the connecting member of the rotated member;

FIG. 14 is a schematic front view of the power transmission unit according to the above embodiment, showing a variant example where the engageable grooves formed at the connecting member of the rotated member are each provided with a sensor (engagement detection unit) for detecting the engagement of the engaging claw with the engageable groove;

FIG. 15 is a schematic illustration of the above variant example, showing a state where one engaging claw engaged with the engageable groove is detected by the above sensor;

FIG. 16 is a flowchart of the above variant example, showing the steps of an operation of mounting the driven unit to the driving unit and properly connecting the connecting member of the rotary member with the connecting member of the rotated member; and FIG. 17 is a block diagram of an image forming apparatus employing the power transmission unit according to the above embodiment.

DESCRIPTION OF THE PREFERRED EMBODIMENTS

In the above-described power transmission unit according to the invention, the rotary member is forwardly rotated by the rotation control unit when the mounting of the driven unit to the driving unit is detected by the above-described mounting detection unit. According to this operation, the connecting member at the rotary member is forwardly rotated by means of the one-way clutch so as to bring at least one of the engaging claws into engagement with the engageable groove even though the engaging claws and the engageable grooves are totally out of engagement. When at least one of the engaging claws is engaged with the engageable groove in this manner, the connecting member at the rotary member and the connecting member at the rotated member are thereby positioned to some degree. Accordingly, the other engaging claws and engageable grooves come into a degree of engagement if not properly engaged together.

Subsequently when the rotary member is reversely rotated in the above-described state, the one-way clutch is disabled for transmission of the rotation of the rotary member to the connecting member. Hence, forward biasing force on the connecting member of the rotary member is released whereby the other engaging claws and engageable grooves in a degree of engagement are allowed to come into engagement. Thus, the respective engaging claws are properly engaged with the respective engageable grooves.

It is noted here that the power transmission unit of the invention may employ, as the above one-way clutch, a spring-type one-way clutch which has a spring fastened by the forward rotation of the rotary member so as to be enabled for transmission of the forward rotation of the rotary member to the connecting member, and which has the spring loosened by the reverse rotation of the rotary member so as to be disabled for transmission of the reverse rotation of the rotary member to the connecting member. The use of such a spring-type one-way clutch provides the following operation. When the rotary member is forwardly rotated to bring at least one of the engaging claws into engagement with the engageable groove and then is reversely rotated, as described above, the spring of this one-way clutch is loosened so that the connecting member of the rotary member is released from the forward biasing force applied thereto by the forward rotation of the rotary member. Hence, the other engaging claws and engageable grooves in a degree of engagement are allowed to come into more positive engagement. Thus, the respective engaging claws are properly engaged with the respective engageable grooves.

In order for the rotation control unit to forwardly rotate the rotary member to a position where at least one of the engaging claws is engaged with the engageable groove, the plurality of engaging claws and the plurality of engageable grooves are circumferentially arranged with equal spacing and the rotation control unit can forwardly rotate the rotary member through at least an angle corresponding to the equal spacing in the circumferential direction.

There may also be provided an engagement detection unit for detecting the engagement of at least one of the engaging claws with the engageable groove. The rotary member is forwardly rotated by the rotation control unit while the engagement of at least one of the engaging claws with the engageable groove can be detected by the engagement detection unit.

In the power transmission unit according to the invention, when the mounting of the driven unit to the driving unit is detected, the rotation control unit forwardly rotates the above-described rotary member to bring at least one of the above-described engaging claws into engagement with the above-described engageable groove and thereafter, reversely rotates this rotary member to bring the respective engaging claws into engagement with the respective engageable grooves. Therefore, the connecting member at the rotary member and the connecting member at the rotated member are properly connected together.

In the power transmission unit according to the invention, therefore, when the rotary member is forwardly rotated with the connecting member at the rotary member and the connecting member at the connected member properly connected together in the state where the driven unit is mounted to the driving unit as described above, the forward rotation of the rotary member is properly transmitted to the rotated member by means of the above-described connecting members so that the rotated member is properly rotated. In addition, the problem is eliminated that load is applied between some of the engaging claws and some of the engageable grooves, causing damage on these.

Next, the embodiments of the invention will be specifically described with reference to the accompanying drawings. It is to be noted that the invention is not limited to the following embodiments but the invention can be appropriately carried out in various ways without departing from the spirit and scope of the invention.

As shown in FIG. 1, the power transmission unit according to the embodiment of the invention includes: a driving unit 10 which includes a rotary member 12 consisting of a gear rotated forwardly or reversely by a drive device 11; and a driven unit 20 including a rotated member 21 connected to the above rotary member 12.

The driven unit 20 is mounted to the driving unit 10 so as to connect a connecting member 13 disposed at the rotary member 12 with a connecting member 22 disposed at the rotated member 21, as shown in FIG. 2. Mounting of the driven unit 20 to the driving unit 10 is detected by a mounting detection unit 30.

The above mounting detection unit 30 may have a structure where a connector is disposed at the driving unit 10 and the rotated member 21, respectively, such that the detection unit detects the mounting of the rotated member 21 to the driving unit 10 in response to electrical connection made between these connectors by mounting the rotated member to the driving unit. Otherwise, the mounting detection unit may also have a structure where a detection sensor including a light emitting portion and a photodetector is disposed at the driving unit 10 while a projection is formed at the rotated member 21. The projection at the rotated member 21 is made to intercept a light path between the light emitting portion and the photodetector by mounting the rotated member 21 whereby the mounting of the rotated member 21 to the driving unit 10 is detected. Further, an alternative structure omitting these members may also be adopted in which power supply to a rotation control unit 31 (to be described hereinlater) of the power transmission unit is simply regarded as the mounting of the rotated member 21 to the driving unit 10. In this case, the rotation control unit 31 also functions as the mounting detection unit 30.

According to this embodiment, the connecting member 13 at the rotary member 12 is axially movably retained relative to an axis 12a of the rotary member 12. Further, a biasing member 14 formed of a spring and interposed between the rotary member 12 and the connecting member 13 biases the connecting member 13 in a direction away from the rotary member 12, namely in a direction toward the connecting member 22 of the rotated member 21.

Further according to this embodiment, the connecting member 13 at the rotary member 12 is connected to the rotary member 12 by means of a spring-type one-way clutch 15. In a case where such a spring-type one-way clutch 15 is employed, the forward rotation of the rotary member 12 fastens the spring of this one-way clutch 15 so that the forward rotation of the rotary member 12 is transmitted to the connecting member 13. Hence, the connecting member 13 is forwardly rotated in conjunction with the forward rotation of the rotary member 12. On the other hand, the reverse rotation of the rotary member 12 loosens the spring of this one-way clutch 15 so that the reverse rotation of the rotary member 12 is not transmitted to the connecting member 13. Hence, the connecting member 13 is not rotated while the rotary member 12 idles alone in the reverse direction.

For connection of the connecting member 13 at the above rotary member 12 with the connecting member 22 at the rotated member 21, this embodiment is arranged as follows. As shown in FIG. 3, the connecting member 13 at the rotary member 12 is formed with a pair of engaging claws 16 on its side opposite from the rotary member 12, namely the side opposed to the connecting member 22 at the rotated member 21. The engaging claws 16 are projected toward the opposite side from the rotary member 12 and are circumferentially spaced 180° apart from each other or diametrically opposed to each other. On the other hand, as shown in FIG. 4, the connecting member 22 at the rotated member 21 is formed with two diametrically extended engageable grooves 23 on its side opposite from the rotated member 21, namely the side opposed to the connecting member 13 at the rotary member 12.

As shown in FIG. 2 and FIG. 5, the connecting member 13 at the above rotary member 12 is biased toward the connecting member 22 at the rotated member 21 by means of the biasing member 14 formed of a spring, so as to bring the individual engaging claws 16 formed at this connecting member 13 into engagement with the engageable grooves 23 formed in the connecting member 22 of the rotated member 21.

According to this embodiment, the engaging claws 16 and the engageable grooves 23 are chamfered at distal ends thereof and edges on the both sides thereof, respectively, where the engaging claws 16 and the engageable grooves 23 come in contact with each other. Such chamfering makes the engaging claws 16 at the connecting member 13 more engageable with the engageable grooves 23 in the connecting member 22 at the rotated member 21 when the engaging claws 16 at the connecting member 13 are brought into engagement with the engageable grooves 23 in the connecting member 22 of the rotated member 21. It is also possible to facilitate the engagement of the engaging claws 16 with the engageable grooves 23 by forming the connecting members 13, 22 of a material having low friction drag.

When the rotary member 12 is forwardly rotated by the drive device 11 with the engaging claws 16 at the connecting member 13 engaged with the engageable grooves 23 in the connecting member 22 at the rotated member 21, as described above, as shown in FIG. 6, the forward rotation of this rotary member 12 is transmitted to the connecting member 13 of the rotary member 12 by means of the above-described one-way clutch 15. Hence, this connecting member 13 is rotated forwardly. In conjunction with the forward rotation of this connecting member 13, the rotated member 21 is forwardly rotated by means of the connecting member 22 of the rotated member 21. In a case where the rotary member 12 is reversely rotated, on the other hand, the reverse rotation is not transmitted to the connecting member 13 of the rotary member 12 by the above-described one-way clutch 15 so that the rotary member 12 idles alone in the reverse direction.

When the driven unit 20 is mounted to the driving unit 10 as described above, the driven unit 20 and the driving unit 10 may sometimes be assembled together in a state where the engaging claws 16 formed at the connecting member 13 of the rotary member 12 are totally out of engagement with the engageable grooves 23 formed in the connecting member 22 of the rotated member 21, as shown in FIG. 7 and FIG. 8.

If the rotary member 12 is forwardly rotated by the drive device 11 in this state, the connecting member 13 is forwardly rotated by means of the one-way clutch 15 as described above. In some cases, as shown in FIG. 5, the engaging claws 16 formed at the connecting member 13 may be brought into engagement with the engageable grooves 23 formed in the connecting member 22 of the rotated member 21. However, as shown in FIG. 9 and FIG. 10, only one of the engaging claws 16 may be engaged with the engageable groove 23 formed in the connecting member 22 of the rotated member 21, causing the inclination of the connecting member 13 of the rotary member 12 so that the other engaging claw 16 is not properly engaged with the engageable groove 23.

When the rotary member 12 is forwardly rotated with the other engaging claw 16 thus failing to make proper engagement with the engageable groove 23, the connection between the connecting member 13 of the rotary member 12 and the connecting member 22 of the rotated member 21 is impaired so that the rotated member 21 is not rotated properly or load is applied between some of the engaging claws 16 and engageable grooves 23, causing damage on these.

According to this embodiment, therefore, when the mounting of the driven unit 20 to the driving unit 10 is detected by the above-described mounting detection unit 30, the mounting detection unit 30 outputs the detection result to the rotation control unit 31.

This rotation control unit 31 is equipped with a microcomputer (not shown), a memory (not shown) and the like, and controls the above-described drive device 11 as follows on the basis of a control program stored in the memory.

In the case where the mounting of the driven unit 20 to the driving unit 10 is detected by the mounting detection unit 30, as described above, this rotation control unit 31 drives the above drive device 11, which forwardly rotates the rotary member 12 so as to bring at least one of the engaging claws 16 into engagement with the engageable groove 23, as shown in FIG. 9 and FIG. 10.

If the engaging claw 16 and the engageable groove 23 are misaligned when the rotary member 12 is forwardly rotated to bring at least one engaging claw 16 into engagement with the engageable groove 23, the misalignment is within the range of 180°. Therefore, at least one of the engaging claws 16 is brought into engagement with the engageable groove 23 by forwardly rotating the rotary member 12 through 180°. In a case where the connecting member 13 of the rotary member 12 is circumferentially formed with three engaging claws 16 at an angular interval of 120° as shown in FIG. 11A while the connecting member 22 of the rotated member 21 is circumferentially formed with three radial engageable grooves 23 at an angular interval of 120° as shown in FIG. 11B, at least one of the engaging claws 16 is brought into engagement with the engageable groove 23 by forwardly rotating the rotary member 12 through 120°. The forward rotation angle of the rotary member 12 can be changed according to the positions of the engaging claws 16 and the engageable grooves 23 formed at the respective connecting members 13, 22.

According to this embodiment, in the state where only one of the engaging claws 16 is engaged with the engageable groove 23 as described above, the above rotation control unit 31 drives the drive device 11, which reversely rotates the rotary member 12, as shown in FIG. 12.

When the rotary member 12 is reversely rotated in this manner, the spring of the above-described one-way clutch 15 is loosened so that the forward biasing force on the connecting member 13 of the rotary member 12 is released, so that the connecting member 13 of the rotary member 12 is slightly moved. Accordingly, the other engaging claw 16 in the misaligned position comes into proper engagement with the engageable groove 23. As shown in FIG. 2 and FIG. 5, the respective engaging claws 16 are properly engaged with the respective engageable grooves 23.

When the rotary member 12 is forwardly rotated by the drive device 11 in this state, the forward rotation of the rotary member 12 is transmitted to the connecting member 13 of the rotary member 12 by means of the above-described one-way clutch 15, as shown in FIG. 6. Hence, this connecting member 13 is rotated forwardly. In conjunction with the forward rotation of this connecting member 13, the rotated member 21 is properly rotated in the forward direction by means of the connecting member 22 of the rotated member 21. Further, the problem that the load is applied between some of the engaging claws 16 and some of the engageable grooves 23 to cause damage thereon is eliminated.

Next, an operation of mounting the driven unit 20 to the driving unit 10 and properly connecting the connecting member 13 of the rotary member 12 with the connecting member 22 of the rotated member 21 according to the embodiment is described with reference to a flow chart shown in FIG. 13.

First, a user performs an operation of mounting the driven unit 20 to the driving unit 10 while the above-described mounting detection unit 30 determines whether the driven unit 20 is mounted to the driving unit 10 or not (S1).

When the driven unit 20 is mounted to the driving unit 10, the above-described rotation control unit 31 forwardly rotates the rotary member 12 through a required angle (S2) so as to bring at least one of the engaging claws 16 into engagement with the engageable groove 23 as described above.

Next, the above-described rotation control unit 31 reversely rotates the rotary member 12 (S3) so as to bring the respective engaging claws 16 into proper engagement with the respective engageable grooves 23 as described above. Thus, the operation of connecting the connecting member 13 of the rotary member 12 with the connecting member 22 of the rotated member 21 is finished.

In order to bring at least one of the engaging claws 16 into proper engagement with the engageable groove 23, this embodiment adopts the method where the rotary member 12 is forwardly rotated through a required angle according to the positions of the engaging claws 16 and the engageable grooves 23 formed at the respective connecting members 13, 22. However, the method of bringing at least one of the engaging claws 16 into proper engagement with the engageable groove 23 is not limited to this.

It is also possible to adopt the following method. As shown in FIG. 14, for example, an engagement detection unit 32 such as a contact sensor for detecting the engagement of the engaging claw 16 with the engageable groove 23 is disposed at the engageable groove 23 formed in the connecting member 22 of the rotated member 21. As shown in FIG. 15, the rotary member 12 is forwardly rotated by the drive device 11 to bring the engaging claw 16 formed at the connecting member 13 of the rotary member 12 into contact with the engagement detection unit 32 disposed at the engageable groove 23. Thereby, the engagement detection unit can detect the engagement of the engaging claw 16 formed at the connecting member 13 of the rotary member 12 with the engageable groove 23 formed in the connecting member 22 of the rotated member 21.

Next, description with reference to a flow chart shown in FIG. 16 is made on an operation of mounting the driven unit 20 to the driving unit 10 and properly connecting the connecting member 13 of the rotary member 12 with the connecting member 22 of the rotated member 21 in the case where the engagement detection unit 32 for detecting the engagement of the engaging claw 16 with the engageable groove 23 is provided.

First, a user performs an operation of mounting the driven unit 20 to the driving unit 10 while the above-described mounting detection unit 30 determines whether the driven unit 20 is mounted to the driving unit 10 or not (S11).

If the driven unit 20 is mounted to the driving unit 10, the rotary member 12 is forwardly rotated by the above-described rotation control unit 31 (S12). Subsequently, determination is made as to whether or not the engagement of at least one of the engaging claws 16 with the engageable groove 23 is detected by the above-described engagement detection unit 32 (S13).

If the engagement of the engaging claw 16 with the engageable groove 23 is not detected, the rotary member continues to be rotated forwardly (S12). If the engagement of the engaging claw 16 with the engageable groove 23 is detected, the above-described rotation control unit 31 stops the forward rotation of the rotary member 12 (S14).

Subsequently, the rotary member 12 is reversely rotated by the above-described rotation control unit 31 (S15) so as to bring the respective engaging claws 16 into proper engagement with the respective engageable grooves 23. Thus, the operation of connecting the connecting member 13 of the rotary member 12 with the connecting member 22 of the rotated member 21 is finished.

In the case where the engagement of the engaging claw 16 with the engageable groove 23 is detected by the engagement detection unit 32, the engagement of at least one of the engaging claws 16 with the engageable groove 23 can be assuredly detected and besides, the forward rotation of the rotary member 12 can be stopped upon detection of the engagement of at least one of the engaging claws 16 with the engage able groove 23. Further, such a structure eliminates the need for changing the angle of forward rotation of the rotary member 12 according to the positions of the engaging claws 16 and the engageable grooves 23 formed at the respective connecting members 13, 22 as described above, or a drawback that the rotary member 12 is forwardly rotated more than necessary.

The above-described operation of mounting the driven unit 20 to the driving unit 10 may be performed before the apparatus is powered on. When the power supply is turned on, therefore, whether or not the driven unit 20 is mounted to the driving unit 10 may be determined by the above-described mounting detection unit 30 before the operation of properly connecting the connecting member 13 of the rotary member 12 with the connecting member 22 of the rotated member 21 is performed.

According to the above embodiment, the engaging claws 16 are formed at the connecting member 13 of the rotary member 12 while the engageable grooves 23 are formed in the connecting member 22 of the rotated member 21. Conversely, an arrangement (not shown) may also be made such that the engageable grooves are formed in the connecting member of the rotary member while the engaging claws are formed at the connecting member of the rotated member.

Apparatuses and the like that use the power transmission unit and the control method for power transmission unit according to the embodiments of the invention are particularly limited but the invention is applicable to image forming apparatuses.

As shown in FIG. 17, for example, a power transmission unit 101 illustrated by the above embodiment may be provided in an image forming apparatus 100. This power transmission unit 101 may be operated to transmit the rotation to a toner bottle 102 containing a toner therein so as to rotatably drive the toner bottle 102 or to transmit the rotation to a photoreceptor drum 104 or a developer roller 105 disposed in a process cartridge 103 so as to rotatably drive the photoreceptor drum 104 or the developer roller 105.

Although the present invention has been fully described by way of examples, it is to be noted that various changes and modifications will be apparent to those skilled in the art.

Therefore, unless otherwise such changes and modifications depart from the scope of the invention, they should be construed as being included therein.

The invention claimed is:

1. A power transmission unit comprising:
a drive device;
a driving unit including a rotary member forwardly or reversely rotated by the drive device;
a driven unit removably mounted to the driving unit and including a rotated member to which the rotation of the rotary member is transmitted;
the rotary member and the rotated member each provided with a connecting member, one of the connecting members circumferentially formed with a plurality of engaging claws projected toward the other connecting member, the other connecting member circumferentially formed with a plurality of engageable grooves to be engaged with the engaging claws, a one-way clutch which transmits the forward rotation of the rotary member to the connecting member disposed at the rotary member but is disabled for transmission of the reverse rotation of the rotary member to the connecting member;

a mounting detection unit for detecting the mounting of the driven unit to the driving unit; and a rotation control unit for controlling the rotation of the rotary member driven by the drive device, wherein in a case where the mounting of the driven unit to the driving unit is detected by the mounting detection unit, the rotation control unit forwardly rotates the rotary member to bring at least one of the engaging claws formed at one of the connecting members of the rotary member and the rotated member into engagement with the engageable groove formed at the other connecting member and thereafter, reversely rotates the rotary member to bring the respective engaging claws formed at the one connecting member into engagement with the respective engageable grooves formed at the other connecting member.

2. The power transmission unit according to claim 1, wherein the one-way clutch is a spring-type one-way clutch which has a spring fastened by the forward rotation of the rotary member so as to be enabled for transmission of the forward rotation of the rotary member to the connecting member, and which has the spring loosened by the reverse rotation of the rotary member so as to be disabled for transmission of the reverse rotation of the rotary member to the connecting member.

3. The power transmission unit according to claim 1, further comprising a biasing member for biasing the one connecting member interconnecting the rotary member and the rotated member toward the other connecting member.

4. The power transmission unit according to claim 1, wherein in order for the rotation control unit to forwardly rotate the rotary member to a position where at least one of the engaging claws is engaged with the engageable groove, the plurality of engaging claws and the plurality of engageable grooves are circumferentially arranged with equal spacing and the rotation control unit forwardly rotates the rotary member through at least an angle corresponding to the equal spacing in the circumferential direction.

5. The power transmission unit according to claim 1, further comprising an engagement detection unit for detecting the engagement of at least one of the engaging claws with the engageable groove, wherein the rotation control unit forwardly rotates the rotary member till the engagement detection unit detects the engagement of at least one of the engaging claws with the engageable groove.

6. An image forming apparatus comprising the power transmission unit according to claim 1.

7. A control method for a power transmission unit including:
a drive device;
a driving unit including a rotary member forwardly or reversely rotated by the drive device;
a driven unit removably mounted to the driving unit and including a rotated member to which the rotation of the rotary member is transmitted;
the rotary member and the rotated member each provided with a connecting member, one of the connecting members circumferentially formed with a plurality of engaging claws projected toward the other connecting member, the other connecting member circumferentially formed with a plurality of engageable grooves to be engaged with the engaging claws,
a one-way clutch which transmits the forward rotation of the rotary member to the connecting member disposed at the rotary member but is disabled for transmission of the reverse rotation of the rotary member to the connecting member;
a mounting detection unit for detecting the mounting of the driven unit to the driving unit; and
a rotation control unit for controlling the rotation of the rotary member driven by the drive device,
the control method comprising the steps:
where the mounting detection unit determines whether the driven unit is mounted to the driving unit or not;
where when the mounting of the driven unit to the driving unit is detected, the rotation control unit forwardly rotates the rotary member to bring at least one of the engaging claws into engagement with the engageable groove; and
where when at least one of the engaging claws is engaged with the engageable groove, the rotary member is reversely rotated to bring the respective engaging claws into engagement with the respective engageable grooves.

8. A computer-readable medium carrying control program for power transmission unit which is applied to a power transmission unit including:
a drive device;
a driving unit including a rotary member forwardly or reversely rotated by the drive device;
a driven unit removably mounted to the driving unit and including a rotated member to which the rotation of the rotary member is transmitted;
the rotary member and the rotated member each provided with a connecting member, one of the connecting members circumferentially formed with a plurality of engaging claws projected toward the other connecting member, the other connecting member circumferentially formed with a plurality of engageable grooves to be engaged with the engaging claws,
a one-way clutch which transmits the forward rotation of the rotary member to the connecting member disposed at the rotary member but is disabled for transmission of the reverse rotation of the rotary member to the connecting member;
a mounting detection unit for detecting the mounting of the driven unit to the driving unit; and
a rotation control unit for controlling the rotation of the rotary member driven by the drive device,
the medium carrying the steps:
where the mounting detection unit determines whether the driven unit is mounted to the driving unit or not;
where when the mounting of the driven unit to the driving unit is detected, the rotation control unit forwardly rotates the rotary member to bring at least one of the engaging claws into engagement with the engageable groove; and
where when at least one of the engaging claws is engaged with the engageable groove, the rotary member is reversely rotated to bring the respective engaging claws into engagement with the respective engageable grooves.

* * * * *